United States Patent [19]

Rivers

[11] 3,740,005

[45] June 19, 1973

[54] ROCKET ASSISTED EJECTION SEATS

[75] Inventor: Alfred James Rivers, Rowledge, Near Farnham, England

[73] Assignee: The Secretary of State for Defense in Her Britannic Majesty's Government of the United Kingdom of Great Britain and Northern Ireland, London, England

[22] Filed: July 1, 1971

[21] Appl. No.: 158,735

[30] Foreign Application Priority Data
July 1, 1970 Great Britain ................. 31879/70

[52] U.S. Cl. .......................................... 244/122 AD
[51] Int. Cl. ............................................. B64d 25/10
[58] Field of Search .................. 244/122 R, 122 A, 244/122 AB, 122 AC, 122 AD, 122 AE

[56] References Cited
UNITED STATES PATENTS 3,362,662  1/1968  McIntyre et al. ............. 244/122 AD
3,259,344  7/1966  Thorp ........................... 244/122 AB FOREIGN PATENTS OR APPLICATIONS
457,152  7/1968  Switzerland ................. 244/122 AB Primary Examiner—Richard E. Aegerter
Assistant Examiner—Johnny D. Cherry
Attorney—Cameron, Kerkham & Sutton

[57] ABSTRACT

A rocket assisted ejection seat has means whereby the thrust line of the rocket motor may be selected, during an ejection sequence, according to the airspeed of the aircraft at the time of the ejection. The thrust line is locked relative to the seat before the rocket motor is fired. A two position arrangement described in detail has the thrust line locked in a position suitable for low speed ejection, selection of, and locking into position of a thrust line suitable for high speed ejection being effected as the seat moves relative to the aircraft at ejection above a predetermined airspeed.

10 Claims, 3 Drawing Figures

ROCKET ASSISTED EJECTION SEATS

The present invention relates to rocket assisted ejection seats for use in aircraft.

During the last few decades the increasing speeds attainable by aircraft have resulted in its becoming difficult or impossible for occupants to abandon a damaged aircraft in flight. To overcome this, seats, known as ejection seats, have been developed which may be ejected, along with their occupants, in flight. In early ejection seats ejection is accomplished using explosive charges. Upon initiation of the ejection sequence the seat becomes slideable along rails mounted substantially vertically relative to the aircraft center-line. The explosive charges are ignited and act, via a piston and cylinder combination, to force the seat along the rails and clear of the aircraft. The arrangement is such that the charges have no effect on the seat once it is clear of the rails, and the velocity of the seat at this point, relative to the aircraft, must be such that under the most adverse conditions the seat will clear protruding aircraft structure such as the fin. The higher the maximum aircraft speed, the higher is the necessary seat ejection speed. The stage has been reached where the required acceleration, which necessarily takes place over the length of the rails, is high enough to cause physical injury to a seat occupant.

To reduce the seat acceleration to an acceptable level whilst still ensuring satisfactory ejection, rocket-assisted ejection seats are now produced. In these, a rocket motor attached to the seat is fired at some stage of the ejection sequence and serves, once the seat leaves the rails, to boost the seat clear of the aircraft.

As the seat emerges from the aircraft structure it is subjected to aerodynamic forces from the airstream, and a pitching moment, tending to pitch the seat backwards, is induced. This pitching moment can have no effect until the seat is clear of the guiding effect of the rails. With explosive ejection the ejection force ceases as the seat leaves the rails and hence any pitching will not affect the seat trajectory. With a rocket motor however, the thrust line of the motor is fixed relative to the seat and pitching of the seat will result in potentially dangerous changes in trajectory. At comparatively low speeds the seats are reasonably stable in pitch, provided that the thrust line of the rocket passes through the center of gravity of the seat and occupant. At higher speeds, above 400 knots, for example, with the higher aerodynamic forces, pitching becomes a serious problem. Pitching at these higher speeds can be prevented or reduced by arranging for the thrust line of the rocket to pass rearward of the center of gravity. This provides a forward pitching moment which at high speeds is cancelled by the aerodynamic backward pitching moment. At low speeds, with lower aerodynamic forces, the seat will tend to pitch forward and its trajectory will again be affected, with possibly disastrous consequences, in, for example, low speed ground level ejections.

It is an object of this invention to provide a rocket assisted ejection seat in which the pitching problems are reduced.

According to the invention, a rocket assisted ejection seat has a rocket motor connected to at least one thrust directing tube, the tube or tubes being moveable between at least two positions giving different thrust lines, the arrangement being such that the position in an ejection sequence is determined according to the airspeed of the aircraft in which the seat is installed.

One embodiment of the invention will now be described, by way of example only, with reference to the accompanying drawings, of which:

Figure 1:
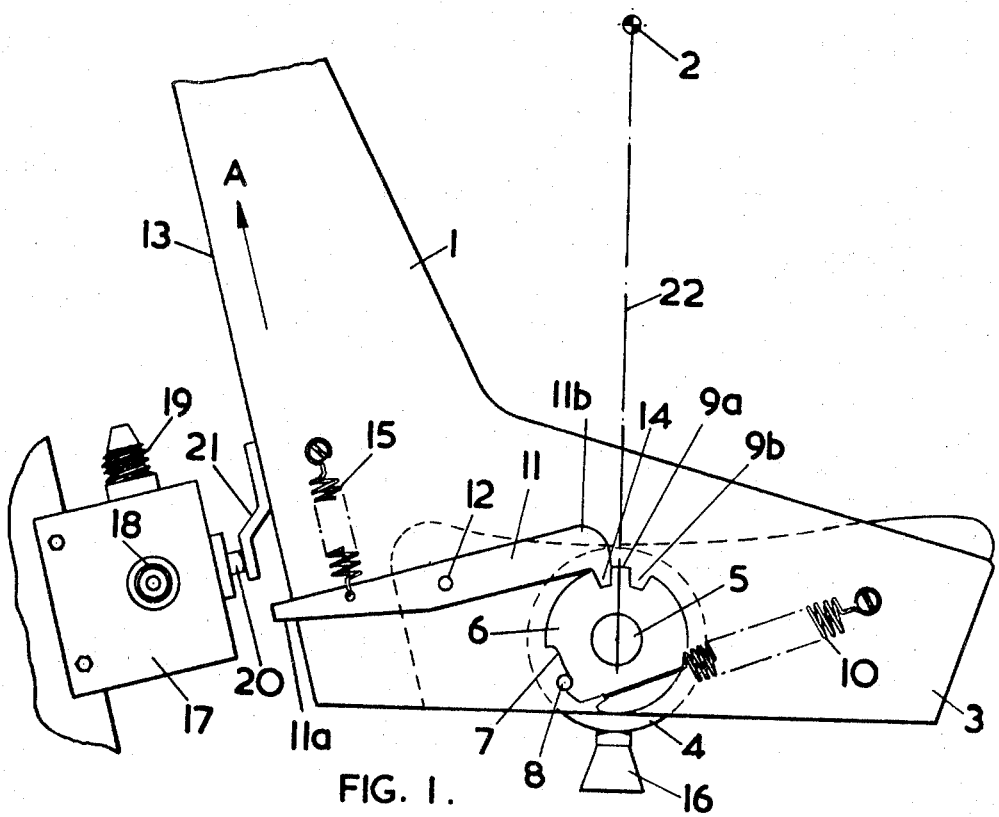
FIG. 1 is a diagrammatic side elevation of a rocket assisted ejected seat.

As shown in the drawings the center of gravity of an ejection seat 1 and occupant (not shown) is at the point 2. In the seat pan 3 of the seat 1 a cylindrical rocket motor 4 is mounted with its axis transverse of the seat. The motor 4 has connected thereto trunnions 5 which are rotatable in bearings on the seat structure. Secured to one end of the rocket motor 4 is a disc 6 with a slot 7 extending part way round its circumference. A pin 8 secured to the seat structure and extending into the slot 7 limits rotational movement of the disc 6 and hence of the motor 4. Two identical notches 9a, 9b are also formed in the circumference of the disc 6. A spring 10 biases the disc 6 towards one of its rotational limits.

A lever arm 11 rotational about a pivot 12 on the seat structure has one end 11a protruding beyond the back 13 of the seat 1, whilst the other end 11b has a protrusion 14 shaped to snugly fit either of the notches 9a, 9b. The disposition of the lever arm 11 and of the notches 9a, 9b is such that when the disc 6 is at its rotational limits the protrusion 14 is aligned with one or the other of the notches 9a, 9b. A spring 15 acts on the lever arm 11 to force the protrusion 14 into engagement with the relevant notch 9a or 9b.

Mounted at each end of the rocket motor 4 is at least one venturi tube such as that shown at 16, through which the rocket motor exhausts when fired. The venturi tubes 16 are disposed radially of the rocket motor 4, the thrust line 22 of the motor 4, when fired, being determined by the position of the rocket motor as determined by the position of the disc 6. As shown, when disc 6 is so positioned that the protrusion 14 engages notch 9a the thrust line 22 passes through the center of gravity 2 of the seat 1 and occupant. When the protrusion 14 engages notch 9b the thrust line 22 passes between the center of gravity 2 and the back 13 of the seat 1.

Attached to the aircraft structure adjacent to the back 13 of the seat 1 is an airspeed sensor 17 having pitot and static tappings 18, 19. The sensor contains a two position plunger 20 which protrudes towards the back 13 of the seat 1. The plunger 20 is spring-loaded towards the extended position, and is restrained in the retracted position by a bellows-operated catch (not shown). The bellows are connected via the tappings 18, 19 to the aircraft pitot-static system and are so balanced that above a predetermined airspeed the catch is withdrawn. With the seat installed and secure in the aircraft, the plunger 20 is restrained in its retracted position by a stop 21 on the back 13 of the seat 1. As the airspeed drops back below the predetermined value the catch reengages. The positioning of the sensor 17 relative to the seat 1 and its ejection path is such that the plunger 20 in its extended position will contact the end 11a of the lever 11, as shown in FIG. 2.

The seat 1 is installed in the aircraft with the projection 14 engaging notch 9a and the spring 10 tending to rotate the disc 6 towards the position where the projection 14 engages the notch 9b. When the seat ejection is initiated in low speed flight an explosive charge (not shown) forces the seat 1 along ejection rails (not shown) in the direction of arrow A (FIG. 1). The plunger 20 slides free of the stop 21, but as the catch is still engaged it remains in the retracted position and clears the end 11a of the lever 11. The rocket motor is fired at some stage of the ejection sequence by, for example, a lanyard connected between the firing mechanism and the aircraft floor, and acts with its thrust line 22 through the center of gravity 2.

Figure 2:
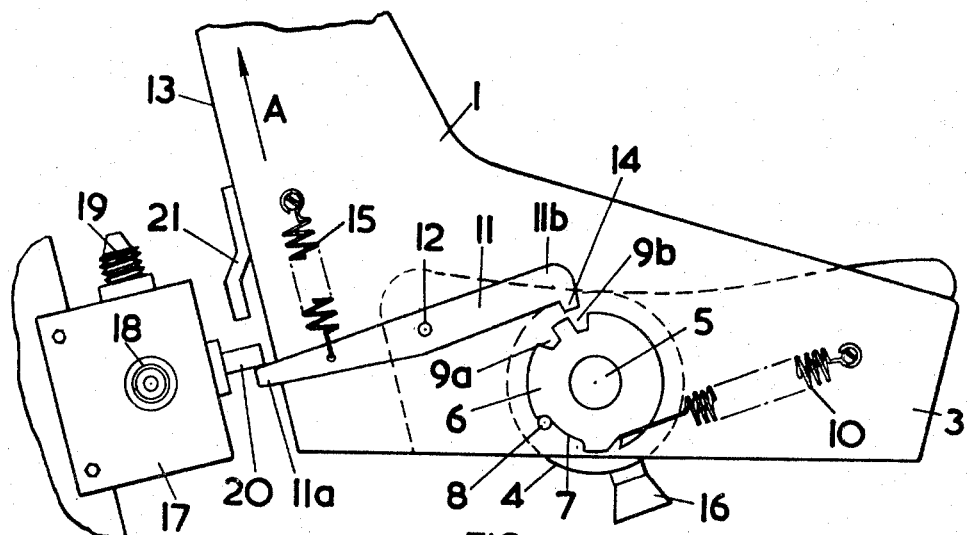
FIG. 2 is a diagrammatic side elevation of the seat shortly after initiation of the ejection sequence in high speed flight.
Figure 3:
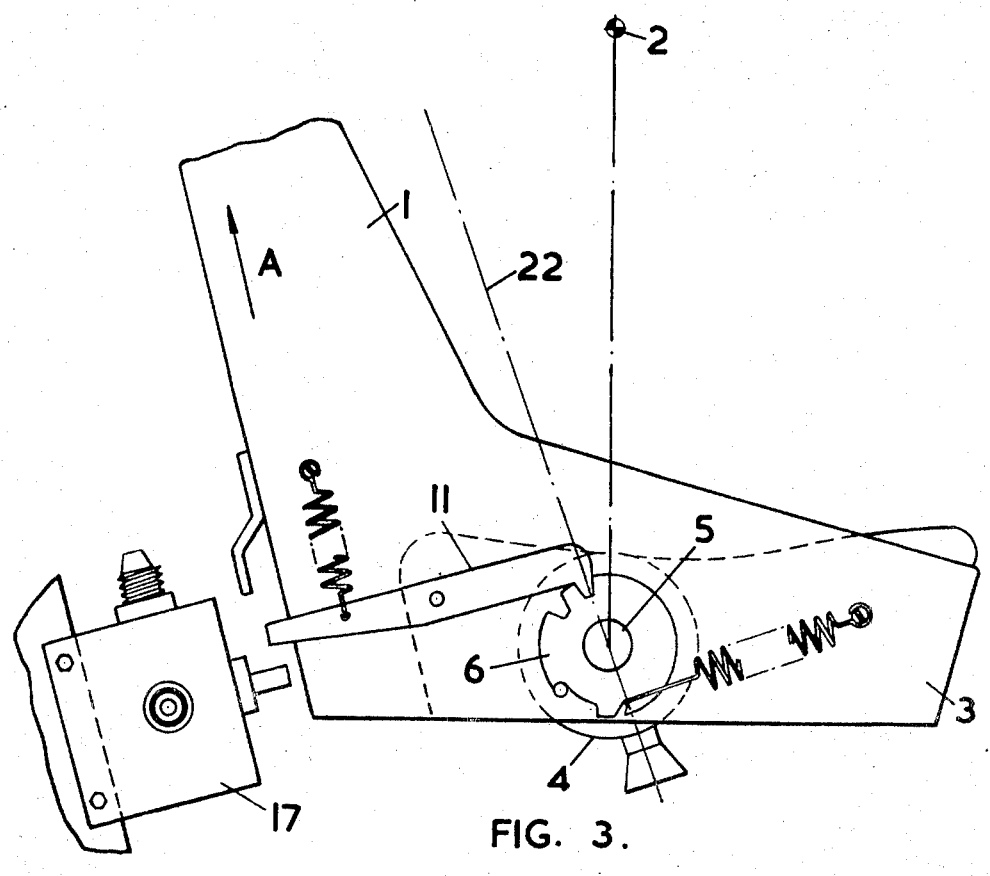
FIG. 3 is a diagrammatic side elevation of the seat shown in FIG. 2 at a later stage of the ejection sequence.

FIGS. 2 and 3 show the sequence when ejection is initiated at a speed greater than the predetermined operating point of the sensor 17. As the seat 1 moves in the direction A the plunger 20 slides clear of the stop 21 and, as the catch has by this time been released, is forced into the extended position. Further movement of the seat 1 brings the plunger 20 into contact with the end 11a of the lever 11, rotating the lever 11 about the pivot 12 and raising the end 11b and projection 14 clear of the notch 9a. The spring 10 then acts to rotate the disc 6 until the end of the slot 7 contacts the stop 8. Finally the plunger 20 rides over the end 11a, and the lever 11 is rotated by spring 15 until the projection 14 engages the notch 9b. The rocket motor 4 is then locked in the position shown in FIG. 3, and when the rocket is fired, it acts with its thrust line 22 between the center of gravity 2 and the back 13 of the seat 1. Thus a forward pitching moment is obtained, and this counteracts the rearward pitching moment caused by the airstream as the seat 1 leaves the guide rails.

The required rocket thrust lines, and the operating point of the airspeed sensor will depend on the characteristics of a particular seat installation. It will be realized that this invention is still a compromise, in that it does not eliminate seat pitching at all conditions. It does, however, reduce the problem. There are obvious advantages in having more than two selectable rocket thrust lines, and mechanisms can easily be devised to provide these. However, the advantages must be weighed against the disadvantages of added complication, especially bearing in mind the fact that the rocket position must be fixed relative to the seat during operation, and extra weight, where weight must be kept to a minimum in both seat and aircraft.

It may in some cases be found convenient to have venturi tubes directing the rocket thrust which are not integral with the rocket motor body. The tubes may be connected to the rocket motor via, for example, gas tight rotatable bearings at the ends of a cylindrical rocket motor, or by flexible tubing. In such cases, the venturi tubes only need be moved to change the rocket thrust line.

Although the above description describes an arrangement whereby the thrust line is changed by rotating the venturi tubes, it will be apparent that the same effect can be achieved by movement of the venturi tubes (with or without the rocket motor) parallel to the fore and aft axis of the seat. Such an arrangement would involve greater complication, but might have advantages in cases where more than two thrust line positions are desirable.

What I claim is:

1. A rocket assisted ejection seat for an aircraft having ejection rails and an airspeed sensing device mounted on structure of the aircraft comprising:
   a seat pan, a back rest, and means for mounting the seat on said ejection rails,
   explosive charge type ejection means arranged to propel the seal along said ejection rails,
   a rocket motor,
   means for firing said rocket motor as the seat leaves the aircraft in an ejection sequence,
   at least one thrust directing tube connected to the rocket motor, and
   position selection means mounted on the seat and operable by said aircraft speed sensing device for adjusting each thrust directing tube between at least two positions giving different rocket thrust lines, said sensing device including control means having at least one output-controlled actuating member, said position selection means and said actuating member being arranged for selective engagement on ejection according to the speed of the aircraft at the time of ejection, thereby adjusting the position of each thrust directing tube.

2. A rocket assisted ejection seat as claimed in claim 1 wherein said position selection means comprises releasable locking means whereby each tube can be locked in a selected position prior to firing of the rocket motor, and means for moving each tube upon release of the locking means.

3. A rocket assisted ejection seat as claimed in claim 2 including means for locking each tube in a position suitable for ejection when the aircraft is flying at airspeeds below a predetermined speed, and means for applying a force to each tube biasing it towards a position suitable for ejection at airspeeds above said predetermined speed, the aircraft speed sensing device releasing the locking means during an ejection sequence sufficiently to allow each tube to move into a position appropriate to the aircraft speed.

4. A rocket assisted ejection seat as claimed in claim 3 wherein said locking means comprise a lever pivoted on the seat structure, said lever and said output-controlled actuating member being arranged for selective engagement on ejection according to the speed of the aircraft at the time of ejection, thereby to control pivoting of the lever to adjust the position of each thrust directing tube.

5. A rocket assisted ejection seat for an aircraft having ejection rails and an airspeed sensing device mounted on structure of the aircraft comprising:
   a seat pan, a back rest, and means for mounting the seat on said ejection rails,
   explosive charge type ejection means arranged to propel the seat along said ejection rails,
   a rocket motor,
   means for firing said rocket motor as the seat leaves the aircraft in an ejection sequence,
   at least one thrust directing tube connected to the rocket motor, and
   position selection means mounted on the seat and operable by said aircraft speed sensing device for adjusting each thrust directing tube between at least two positions giving different rocket thrust lines, said sensing device including control means having at least one output-controlled actuating member, said position selection means and said actuating member being arranged for engagement on ejection according to the speed of the aircraft at the time of ejection, thereby adjusting the position of each thrust directing tube, each tube being rigidly secured to a disc rotatable about an axis transverse of the seat pan and having discontinuities in its circumference, said discontinuities being arranged to co-act with the lever to lock the disc into a desired position.

6. A rocket assisted ejection seat as claimed in claim 5 wherein:

each tube is moveable between two positions, is locked in a position corresponding to a low aircraft speed and has a force applied to it biassing it towards a position corresponding to a high aircraft speed, the disc is notched in two positions on its circumference, the lever has a protrusion at one end, said protrusion being arranged to lockingly engage the notched circumference of the disc, the other end of the lever protruding rearwards beyond the back of the seat, and a force is applied to the lever biassing it into engagement with the disc, and the aircraft speed sensing device is mounted behind the seat and comprises a two position plunger which protrudes towards the back of the seat, the plunger being spring loaded towards the extended position and retained in the retracted position below a predetermined aircraft speed by a bellows operated catch, the bellows being sensitive to aircraft speed, and retained in the retracted position above the predetermined aircraft speed by a stop secured to the back of the seat, the disposition of the plunger, of the stop and of the lever being such that in an ejection sequence below the predetermined aircraft speed the plunger does not contact the lever, whilst in an ejection sequence above the predetermined aircraft speed the plunger rides off the stop and extends, contacts the end of the lever, causing the lever to pivot clear of the disc, and then releases the lever.

7. A rocket assisted ejection seat as claimed in claim 6 wherein the disc is also slotted on its circumference, and a pin secured to the seat structure co-acts with the slotted circumference to limit movement of the disc.

8. A rocket assisted ejection seat as claimed in claim 7 wherein the biassing force to each tube is applied by a spring acting on the disc, and the biassing force to the lever is applied by another spring.

9. A rocket assisted ejection seat as claimed in claim 8 wherein the rocket motor is mounted in the seat pan with its axis transverse of the seat pan, there being a thrust directing tube adjacent each end of the motor.

10. A rocket assisted ejection seat as claimed in claim 9 wherein the rocket motor, the disc, and the thrust directing tubes are integral and are arranged to rotate together.

* * * * *